(12) United States Patent
Magarida et al.

(10) Patent No.: US 9,903,424 B2
(45) Date of Patent: Feb. 27, 2018

(54) SELECTABLE ONE-WAY CLUTCH

(71) Applicant: TOYOTA JIDOSHA KABUSHIKI KAISHA, Toyota-shi, Aichi-ken (JP)

(72) Inventors: Naofumi Magarida, Shizuoka-ken (JP); Kenji Itagaki, Shizuoka-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 232 days.

(21) Appl. No.: 15/053,503

(22) Filed: Feb. 25, 2016

(65) Prior Publication Data
US 2016/0281801 A1 Sep. 29, 2016

(30) Foreign Application Priority Data
Mar. 23, 2015 (JP) .................. 2015-059264

(51) Int. Cl.
  F16D 43/25 (2006.01)
  F16D 41/12 (2006.01)
  F16D 28/00 (2006.01)
  F16D 41/14 (2006.01)

(52) U.S. Cl.
  CPC ............ F16D 43/25 (2013.01); F16D 28/00 (2013.01); F16D 41/125 (2013.01); F16D 41/14 (2013.01); F16D 2300/14 (2013.01)

(58) Field of Classification Search
  CPC .......... F16D 43/25; F16D 41/14; F16D 28/00; F16D 41/125; F16D 2300/14
  See application file for complete search history.

(56) References Cited

U.S. PATENT DOCUMENTS

| 4,169,527 A * | 10/1979 | Bopp ............... F01P 7/087 192/74 |
| 2012/0292155 A1* | 11/2012 | Gunter ............... B64C 13/50 192/82 T |
| 2016/0160942 A1 | 6/2016 | Shioiri et al. |
| 2016/0377126 A1* | 12/2016 | Essenmacher ......... F16D 27/02 192/84.6 |

FOREIGN PATENT DOCUMENTS

| JP | 2002-514292 A | 5/2002 |
| JP | 2016-109254 A | 6/2016 |
| WO | 98/49456 A1 | 11/1998 |

* cited by examiner

Primary Examiner — David J Hlavka
(74) Attorney, Agent, or Firm — Andrews Kurth Kenyon LLP

(57) ABSTRACT

A selectable one-way clutch includes pawl members provided to a held plate rotatably via a spindle; a selector plate rotatable between a lock position where the pawl members are protrudable from the held plate and a release position where the pawl members are kept in a state the pawl members are housed in the held plate side by contacting a non-formation portion where no aperture is formed; and a device which restricts an operation of the pawl members by using volume change of material whose volume changes according to temperature change, so that the pawl members are more restricted to protrude from the first plate as an environmental temperature gets lower.

5 Claims, 6 Drawing Sheets

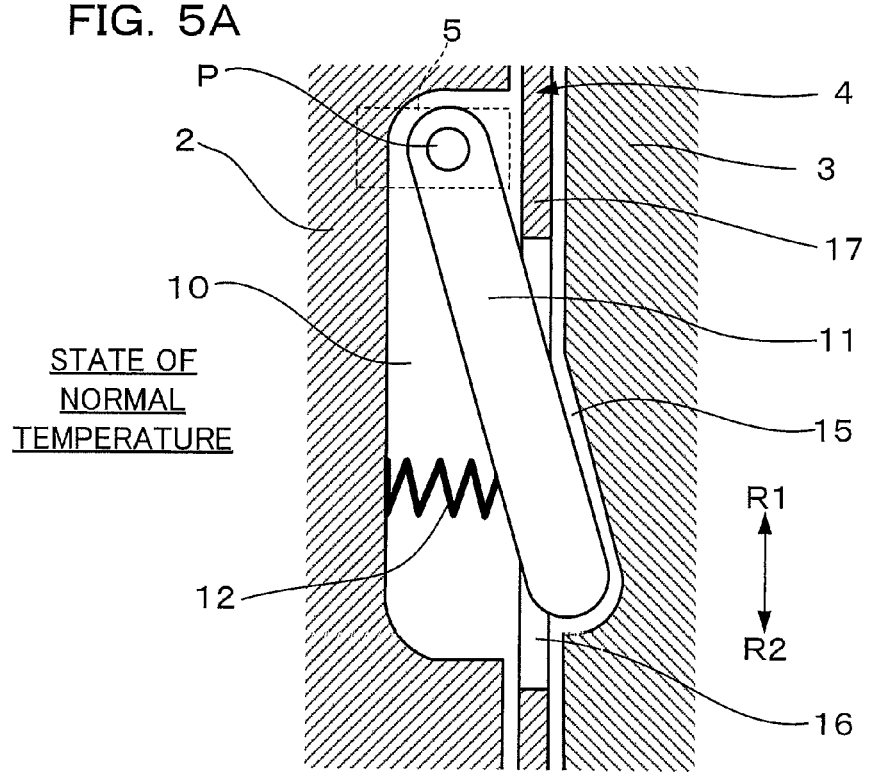
FIG. 5A STATE OF NORMAL TEMPERATURE
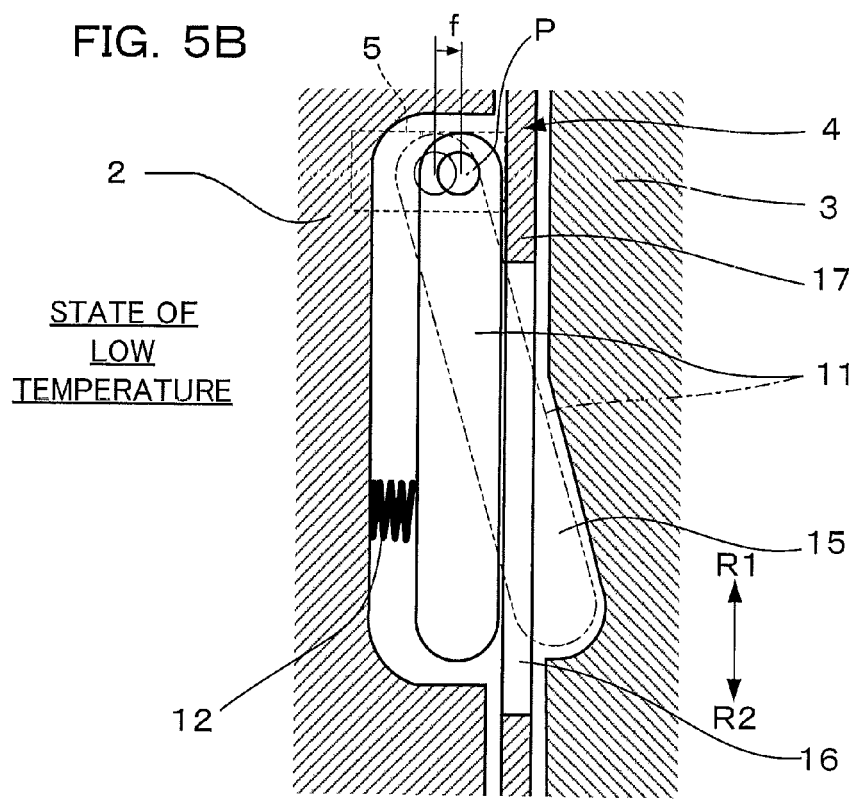
FIG. 5B STATE OF LOW TEMPERATURE

VARIATION
(STATE OF LOW TEMPERATURE)

SELECTABLE ONE-WAY CLUTCH

CROSS-REFERENCE TO RELATED APPLICATION

The present application claims priority to Japanese Patent Application No. 2015-059264 filed on Mar. 23, 2015, which is incorporated herein by reference in its entirety.

TECHNICAL FIELD

The present invention relates to a selectable one-way clutch which is capable of performing selectively a function of a one-way clutch.

BACKGROUND ART

As a selectable one-way clutch, known is such a selectable one-way clutch that a plate where pawl members are provided protrudably and a plate where recesses are formed for engaging with the pawl members respectively are provided on a shared axial line, and by changing the state of the pawl members only by a selector plate provided between the two plates, a mode with respect to torque transmission between the two plates is selectable from either a lock mode where the transmission is allowed only when a rotational direction is a predetermined one direction or a release mode where the torque transmission is blocked regardless of the rotational direction (the patent literature 1).

CITATION LIST

Patent Literature

Patent literature #1: JP2002-514292A.

SUMMARY OF INVENTION

Technical Problem

The selectable one-way clutch of the patent literature 1 switches the mode between the lock mode and the release mode by rotating the selector plate. Therefore, in a state that the selectable one-way clutch is soaked in gear oil, the selector plate is affected by viscous property of the gear oil intervening between the plate where the recesses are formed and the selector plate. Especially, in a case where the temperature of gear oil is low, since the viscous property of gear oil becomes high, the selector plate is easily affected. When the viscous property of gear oil becomes high, a shearing force of gear oil intervening between the plate where the recesses are formed and the selector plate becomes large. Due to this, there is a possibility that torque acting on the selector plate by the rotation of the plate exceeds torque keeping the selector plate in the release mode and thereby the selector plate unintentionally rotates. Because of the unintentional rotation of the selector plate like this, there could happen such an erroneous engagement that the pawl members are not restricted to protrude by the selector plate and engage with the recesses even in a case where the release mode should be kept.

Based on the above problem, the present invention aims to provide a selectable one-way clutch capable of suppressing occurrence of the erroneous engagement that the pawl members engage with the recesses even if the selector plate rotates unintentionally.

Solution to Problem

A selectable one-way clutch as one aspect of the preset invention is a selectable one-way clutch comprising: a first plate and a second plate which are disposed on an axial line shared with each other; at least one pawl member, each being provided to the first plate rotatably via a spindle in such a manner that the pawl member is capable of protruding from the first plate toward the second plate, and, in a case of protruding from the first plate, engages with a recess formed in the second plate only when the second plate is rotating in a predetermined one rotational direction; a selector plate where at least one aperture which the pawl member is allowed to pass through is formed, the selector plate being rotatable relatively to the first plate between a lock position where the pawl member is allowed to protrude from the first plate by passing through the aperture and a release position where the pawl member is kept in a state that the pawl member is housed in a first plate side by contacting a non-formation portion where no aperture is formed; and a device which restricts an operation of the pawl member, by using volume change of material whose volume changes according to temperature change, so that the pawl member is more restricted to protrude from the first plate as an environmental temperature gets lower.

According to the present invention, in a case where a selectable one-way clutch is in a state of being soaked in gear oil, even if the selector plate whose rotational position should be held at the release position in a low-temperature environment, rotates unintentionally by the viscous property of the gear oil and the rotational position is switched to the lock position, it is possible to suppress the protrusion of the pawl members since the pawl members contact the non-formation portion where no aperture is formed. Due to this, it is possible to suppress, even if the selector plate unintentionally rotate, occurrence of the erroneous engagement that the pawl members engage with the recesses of the second plate.

BRIEF DESCRIPTION OF DRAWINGS

FIG. 5A is a sectional view showing a state of normal temperature;

FIG. 5B is a sectional view showing a state of low temperature; and

DESCRIPTION OF EMBODIMENTS

Figure 1:
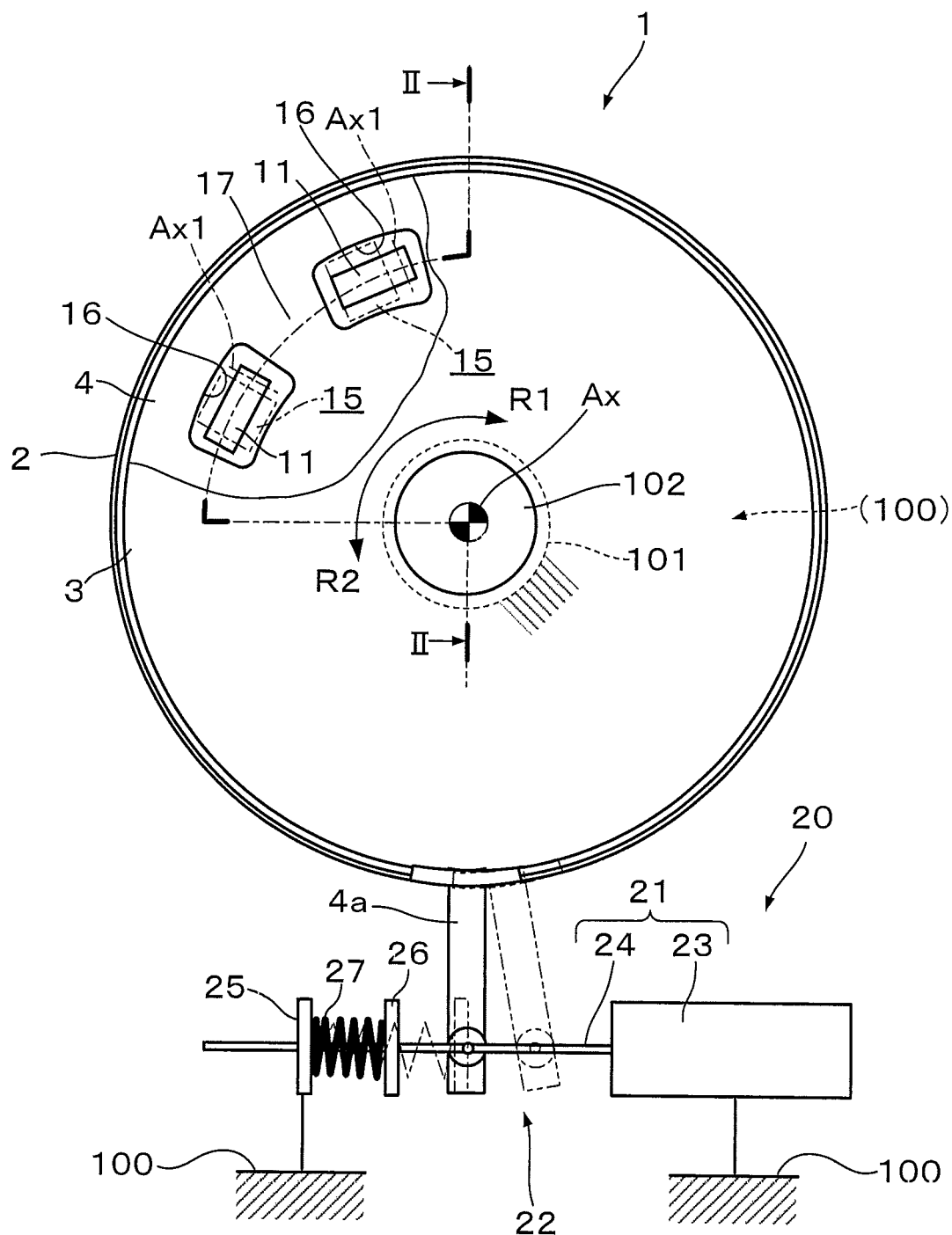
FIG. 1 shows a selectable one-way clutch according to one embodiment of the present invention.

As shown in FIG. 1, a selectable one-way clutch (hereinafter referred to as "the clutch") 1 is used by being built in a unillustrated hybrid transaxle. The clutch 1 intervenes between a fixed shaft 101 fixed to a case 100 and a rotational shaft 102 which is rotatable around an axial line Ax shared with the fixed shaft 101. An operation mode of the clutch 1 is selectable from either a lock mode or a release mode. In the lock mode, a state of the rotational shaft 102 is switched between the following two states: one state that, in a case that a rotational direction of the rotational shaft 102 is R1, torque transmission from the rotational shaft 102 to the fixed shaft 101 is allowed and the rotational shaft 102 is fixed; and another state that, in a case that the rotational direction of the rotational shaft 102 is R2, torque transmission from the rotational shaft 102 to the fixed shaft 101 is blocked and the rotational shaft 102 is released. In the release mode, the torque transmission from the rotational shaft 102 to the fixed shaft 101 is blocked and the rotational shaft 102 is released, regardless of whether the rotational direction of the rotational shaft 102 is R1 and R2.

The clutch 1 comprises: a held plate 2 fixed to the fixed shaft 101; a rotational plate 3 provided rotatably around the axial line Ax integrally with the rotational shaft 102; and a selector plate 4 arranged between the held plate 2 and the rotational plate 3 and provided rotatably around the axial line Ax. The held plate 2 corresponds to a first plate of the present invention, and the rotational plate 3 corresponds to a second plate.

Figure 2:
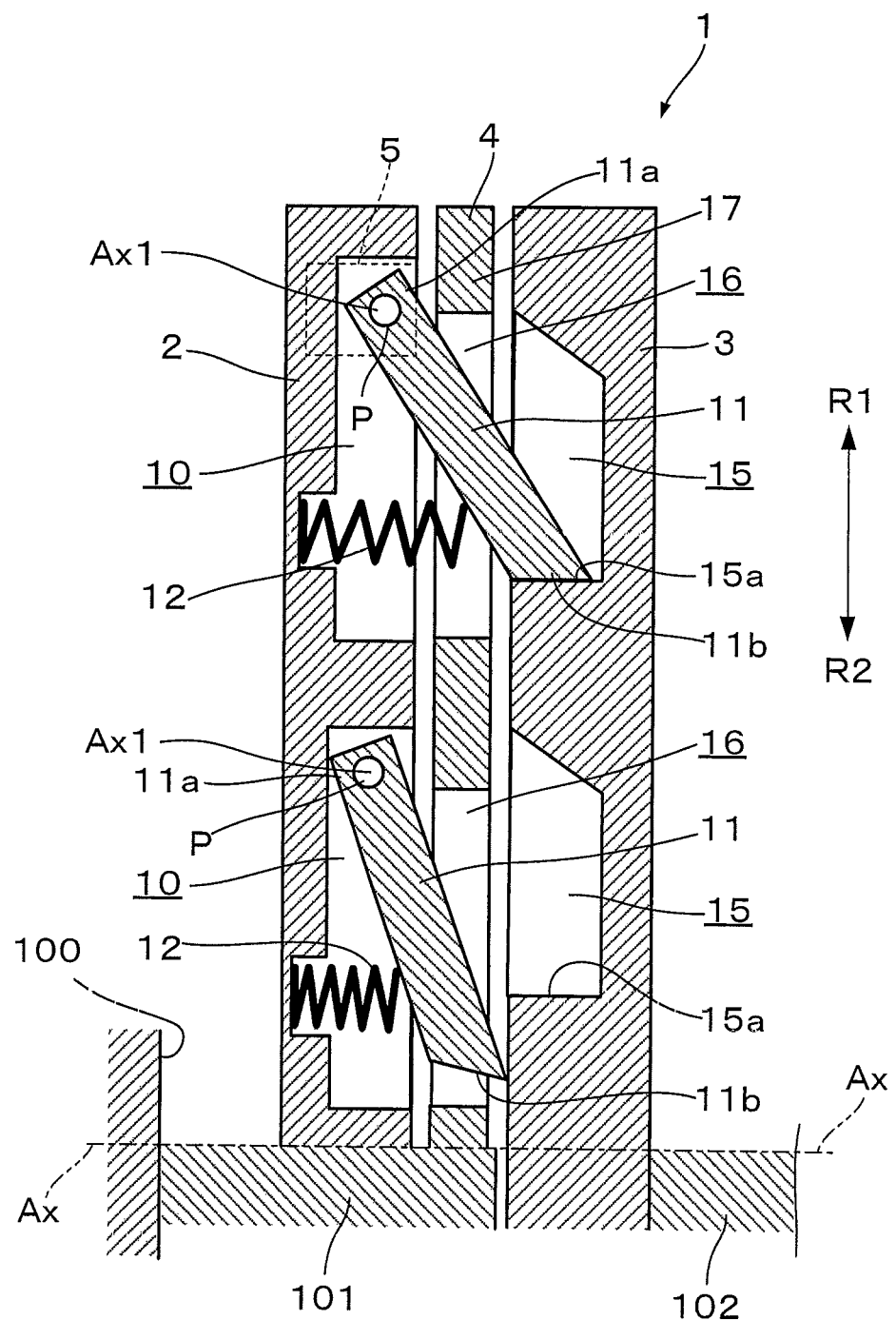
FIG. 2 is a sectional view with respect to a line II-II shown in FIG. 1 at time of a lock mode.
Figure 3:
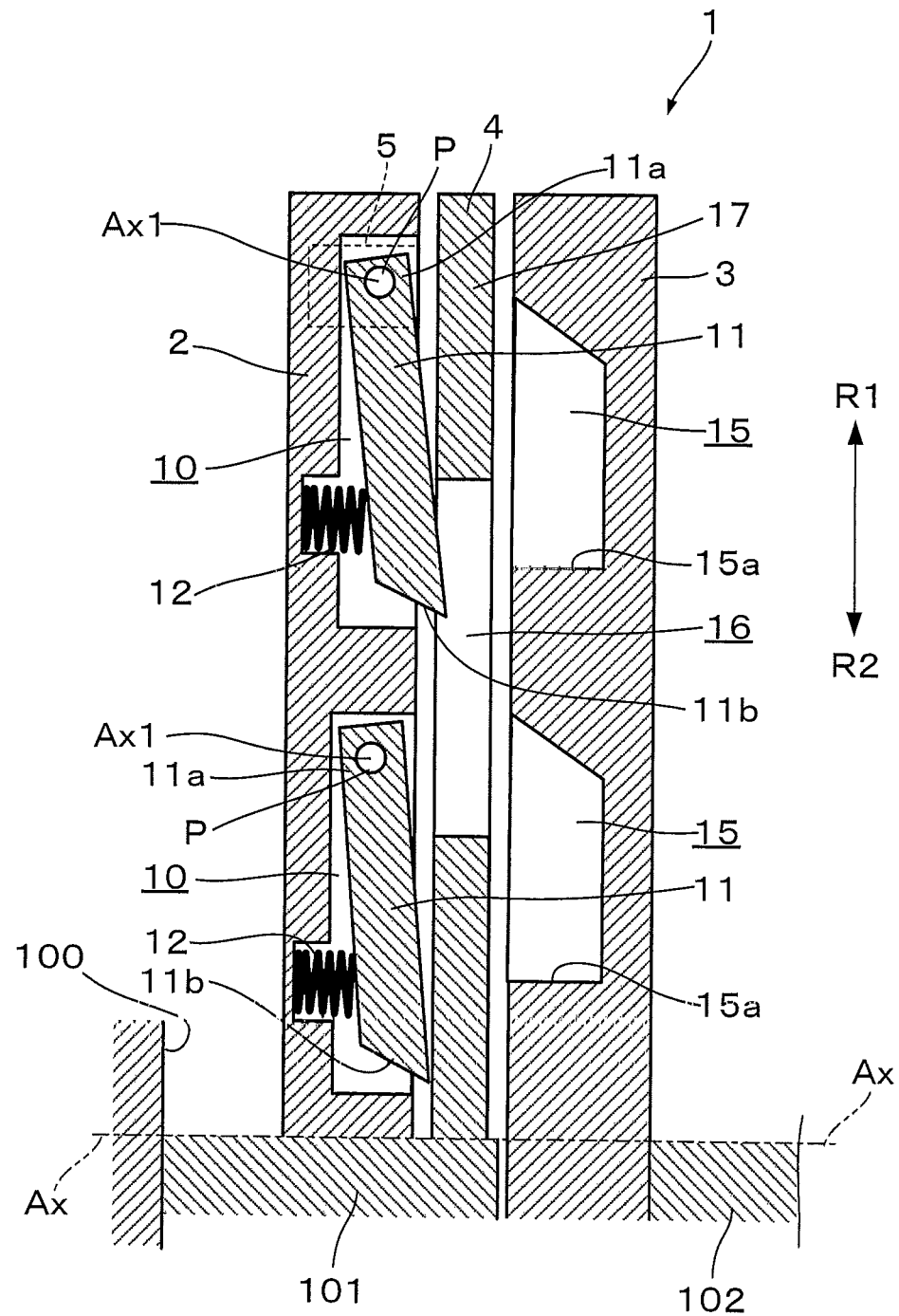
FIG. 3 is a sectional view with respect to the line II-II shown in FIG. 1 at time of a release mode.

As shown in FIGS. 2 and 3, on the held plate 2, a plurality of holding pockets 10 each opening at a surface of the held plate 2 that faces the rotational plate 3 are formed so as to be arranged in a circumferential direction. For each holding pocket 10, a pawl member 11 to engage with the rotational plate 3 is provided one by one. Each pawl member 11 is provided to the held plate 2 via a spindle P in such a manner that a base end 11a of the pawl member 11 is capable of rotating around an axial line Ax1 extending in a radial direction of the held plate 2, and each pawl member 11 is biased in a protruding direction to the rotational plate 3 by a spring 12. Thereby, each pawl member 11 is capable of going into either one of two operation states: a first state that the pawl member 11 backs into the held plate 2 side to be housed in the holding pocket 10 and a second state that the pawl member 11 protrudes toward the rotational plate 3 from the held plate 2. That is, each pawl member 11 is provided to the held plate 2 in such a manner that the pawl member 11 is capable of protruding. The spindle P is provided to the held plate 2 via a spindle moving mechanism 5 mentioned later.

As shown in FIG. 1, on the rotational plate 3, a plurality of recesses 15 opening at a surface of the rotational plate 3 that faces the held plate 2 are formed in such a way that the recesses 15 are arranged in a circumferential direction. Each recess 15 has a wall portion 15a where a front end 11b of the pawl portion 11 abuts at time when a protruding pawl member 11 engages with the recess 15. Not illustrated, but the number of recesses 15 is more than the number of pawl members 11, and the phase of each recess 15 and the phase of each pawl member 11 are different from each other (see FIG. 2). Accordingly, a part of the plurality of pawl members 11 which are protruding engage with a part of the plurality of recesses 15.

In the selector plate 4, a plurality of apertures 16 are formed in the same phase as the pawl members 11 respectively. The plurality of apertures 16 are arranged in a circumferential direction, and each of the plurality of apertures 16 can allow a part of the protruding pawl member 11 to pass therethrough. It is possible to switch a rotational position of the selector plate 4 between a lock position shown in FIG. 2 and a release position shown in FIG. 3. In the lock position, the pawl member 11 can be allowed to pass through the aperture 16 of the selector plate 4 and to engage with the recess 15 of the rotational plate 3. In the release position, a front end 11b of the pawl member 11 abuts against a non-formation portion 17 of the selector plate 4 where no aperture 16 is formed, and thereby, the pawl member 11 is restricted to protrude so that it is possible to keep the pawl member 11 in a state that the pawl member is housed in the held plate 2 side. Thereby, the lock mode and release mode mentioned above are realized selectively.

As shown in FIG. 1, the selector plate 4 is provided with an operation arm 4a extending in a radial direction. The operation arm 4a is driven by a drive device 20 and thereby the rotational position of the selector plate 4 is switched. The drive device 20 comprises an actuator 21 and a transmission mechanism 22 for transmitting operation of the actuator 21 to the operation arm 4a of the selector plate 4. The actuator 21 includes a main body 23 fixed to the case 100; and a drive rod 24 which is capable of heading from and backing to the main body 23 and also link-connected with the operation arm 4a. The transmission mechanism 22 is fixed to the case 100, and includes a guide member 25 which guides the drive rod 24 of the actuator 21; a spring sheet 26 fixed to the drive rod 24; and a return spring 27 mounted between the guide member 25 and the spring sheet 26 in a compressed state.

The state shown in FIG. 1 with solid lines is a state that the rotational position of the selector plate 4 has been switched to the lock position, by making the actuator 21 of the drive device 20 work to protrude the drive rod 24 from the main body 23 while resisting an elastic force of the return spring 27. The clutch 1 of this state goes into the lock mode mentioned above. On the other hand, in a case where, from the state shown in FIG. 1 with the solid lines, the actuator 21 of the drive device 20 is switched to a non-operation state, the drive rod 24 backs to the main body 23 side by the elastic force of the return spring 27 and thereby the operation arm 4a moves to the position shown by chain double-dashed liens, so that the rotational position of the selector plate 4 is switched to the release position. Due to this, the clutch 1 goes into the release mode.

In a case of the lock mode shown in FIG. 2, at time when the rotational direction of the rotational plate 3 is R1, the front end 11b of the pawl member 11 abuts against the wall portion 15a of the recess 15. Accordingly, the pawl member 11 engages with the recess 15 of the rotational plate 3, so that the held plate 2 and the rotational plate 3 are connected with each other, and thereby the torque transmission between the plates is allowed and the rotational plate 3 is fixed to the case 100. On the other hand, at time when the rotational direction of the rotational plate 3 is R2, since the pawl members 11 are inclined toward the direction R2, even if the pawl member 11 reaches the recess 15 of the rotational plate 3, the pawl member 11 is just returned toward the held plate 2. Therefore, the pawl member 11 does not engage with the recess 15. Accordingly, in a case where the clutch 1 is in the lock mode, at time when the rotational direction of the rotational plate 3 is R2, the torque transmission from the rotational plate 3 to the held plate 2 is blocked, so that the rotational plate 3 is released.

On the other hand, in a case of the release mode shown in FIG. 3, the pawl member 11 contacts the non-formation portion 17 of the selector plate 4 where no aperture 16 is formed and thereby each pawl member 11 is kept in a state that the pawl member 11 is housed in the held plate 2 side. Therefore, the pawl members 11 do not reach the recesses 15 of the rotational plate 3. Accordingly, regardless of whether the rotational direction of the rotational plate 2 is R1 or R2, the torque transmission from the rotational plate 3 to the held plate 2 is blocked and thereby the rotational plate 3 is released. The release state shown in FIG. 3 is kept by the elastic force of the return spring 27 mentioned above.

The clutch 1 is soaked in gear oil existing in the case 100. The gear oil intervenes in each space between the plates 2, 3, and 4. The gear oil has viscous property. Due to this, when the rotational plate 3 rotates, a part of the torque from the rotation could transmit to the other plates via the gear oil. Thereby, the clutch 1 is influenced by the viscous property of gear oil.

Because of the rotation of the rotational plate 3, torque in a direction from the release position to the lock position could act on the selector plate 4. Especially, in a case where the gear oil has high viscous property in a low temperature environment, the torque becomes bigger than in the other environments. In such a situation, when the torque acting on the selector plate 4 exceeds torque generated by the elastic force of the return spring 27, even though the actuator 21 of the drive device 20 is in the non-operation state, it could happen that the selector plate rotates unintentionally so that the rotational position is switched to the lock position.

In order to restrict the protrusion of each pawl member 11, even if the selector plate 4 rotates unintentionally so that the rotational position is switched from the release position to the lock position at time of low temperature of gear oil, the clutch 1 has a spindle moving mechanism 5 which supports the spindle P movably in a direction close to the selector plate 4, the spindle P rotatably supporting the pawl member 11.

Figure 4:
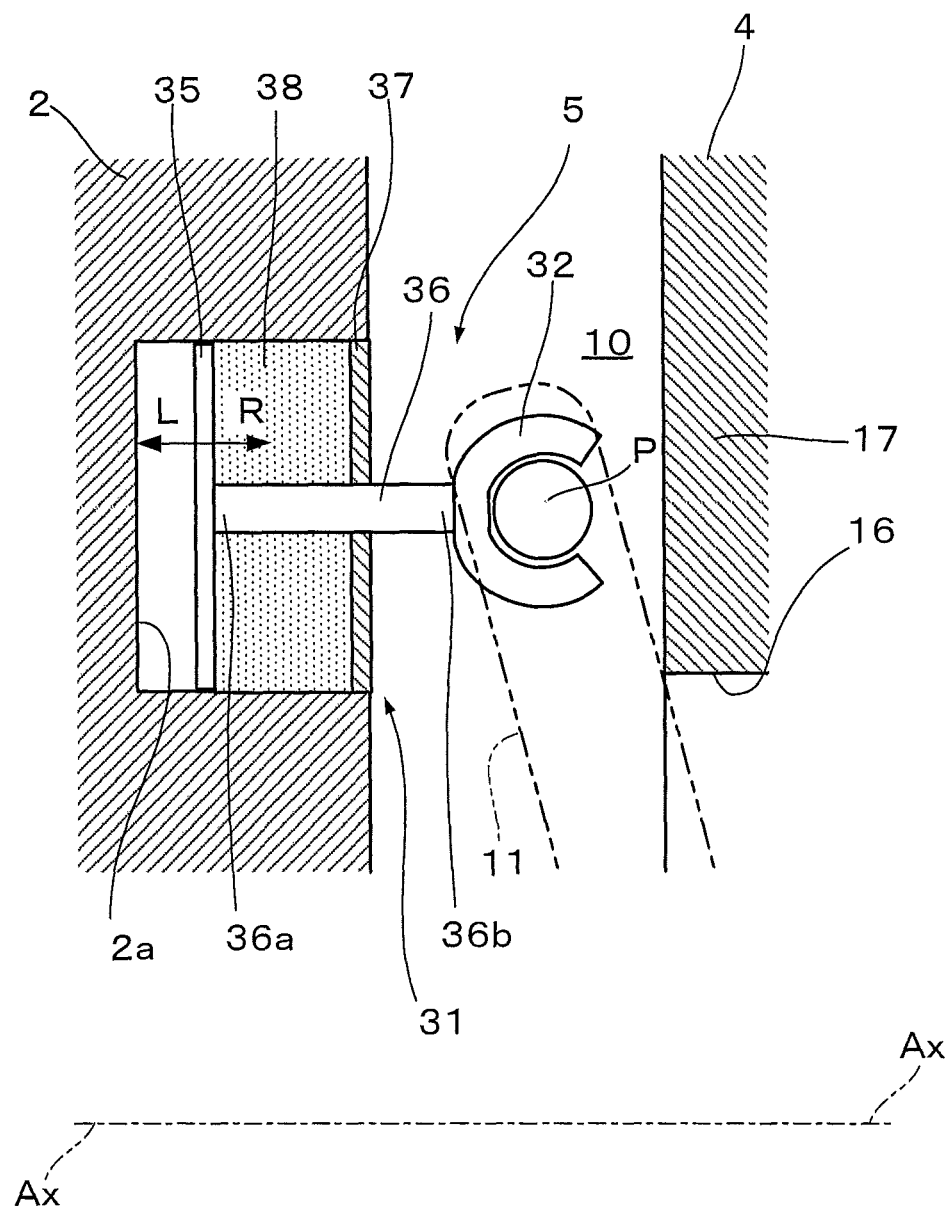
FIG. 4 is a sectional view showing details of a spindle moving mechanism.

As shown in FIG. 4, the spindle moving mechanism 5 is provided to the held plate 2. The spindle moving mechanism 5 comprises a displacement portion 31 provided to a cylinder 2a formed into a closed-end cylindrical shape in the held plate 2; and a holding portion 32 provided to the displacement portion 31 to hold the spindle P. The displacement portion 31 includes a movable plate 35 provided in the cylinder 2a slidably in the axial line Ax direction with respect to the cylinder 2a; an interlock shaft 36 extending in the axial line Ax direction, where a base end 36a is fixed to the movable plate 35; a lid 37 closing an opening portion of the cylinder 2a where the interlock shaft 36 is inserted; and an encapsulation material 38 encapsulated in a region surrounded by the movable plate 35, the cylinder 2a, and the lid 37. As the encapsulation material 38, it is preferable to employ a material whose volume change according to temperature change is sufficiently bigger in comparison with the volume change of the held plate 2 and the like. For example, a material, such as wax, whose volume changs according to temperature change can be selected. The holding portion 32 is fixed to a front end 36b of the interlock shaft 36, and is configured as a bearing for rotatably holding the spindle P.

In the spindle moving mechanism 5, when an environmental temperature becomes low in the state shown in FIG. 4, the encapsulation material 38 is reduced. Therefore, the movable plate 35 moves to the right, the direction being shown by an arrow R in FIG. 4. Thereby, the interlock shaft 36 fixed to the movable plate 35 and the holding portion 32 fixed to the interlock shaft 36 move in the same direction. As a result of that, the spindle P moves in the direction close to the selector plate 4. On the other hand, in the spindle moving mechanism 5, when the environmental temperature becomes high in the state shown in FIG. 4, the encapsulation material swells. Therefore, the movable plate 35 moves to the left, the direction being shown by an arrow L in FIG. 4. Thereby, the holding portion 32 interlocking with the movable plate 35 moves to the left direction in FIG. 4. As a result, the spindle P moves in a direction leaving from the selector plate 4.

FIG. 5A shows a case of normal temperature. In this case, as mentioned above, when the selector plate 4 is located at the lock position, the pawl member 11 is allowed to protrude while rotating without influence by the non-formation portion 17 of the selector plate 4 where no aperture 16 is formed, and to engage with the recess 15 of the rotational plate 3 in a state of passing through the aperture 16. On the other hand, FIG. 5B shows a case of low temperature. In this case, as mentioned above, the spindle P rotatably supporting the pawl member 11 moves in a direction f close to the selector plate 4. Thereby, even if the selector plate 4 is located at the lock position, the pawl member 11 contacts the non-formation portion 17 of the selector plate 4 where no aperture 16 is formed and thereby the pawl member 11 is not allowed to sufficiently rotate. That is, the pawl member 11 goes into a state that the pawl member 11 is not allowed to pass through the aperture 16. Accordingly, even if the rotational position of the selector plate 4 is switched from the release position to the lock position unintentionally by the influence of viscous property of gear oil, the pawl members is restricted to protrude.

Thereby, it is possible to suppress occurrence of erroneous engagement such that the pawl member 11 engages with the recess 15 of the rotational plate 3.

The present invention is not limited to the above embodiment, and can be executed in various embodiments within a range of the subject-matter of the present invention. In the above embodiment, the held plate 2 as the first plate is fixed unrotatably, and the rotational plate 3 as the second plate is rotatable around the axial line Ax. However, this embodiment is only one example with respect to a clutch. For example, it is possible to execute the present invention in such an embodiment that the first plate and the second plate are allowed to relatively rotate around a shared axial line.

Figure 6:
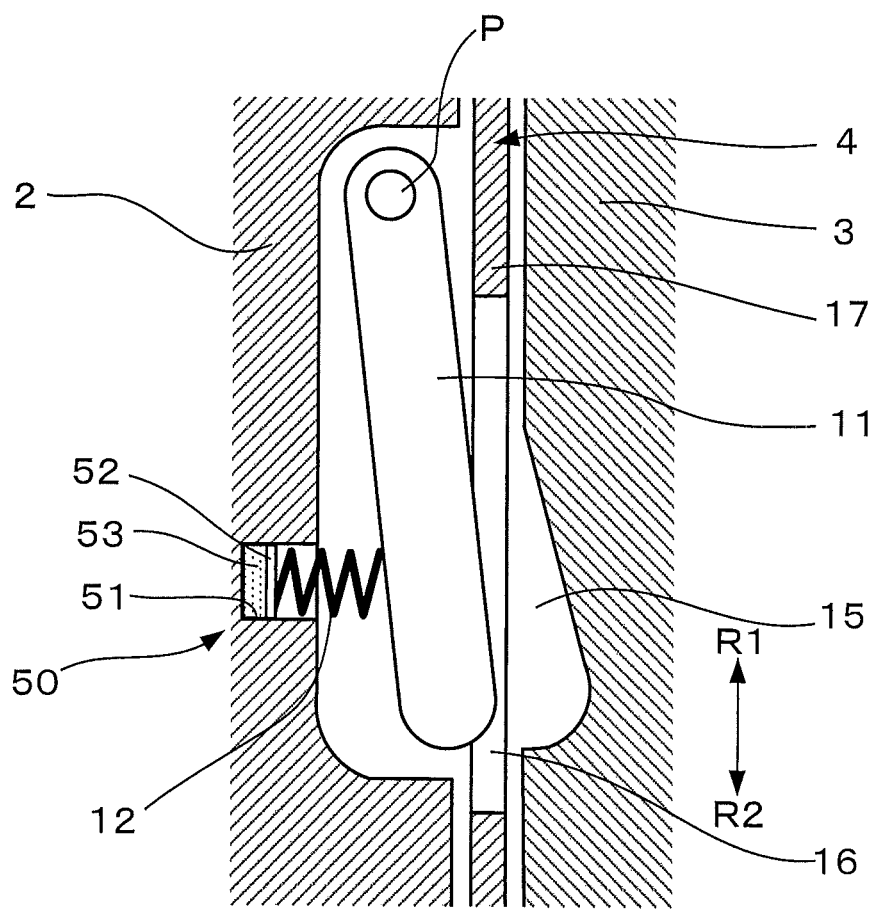
FIG. 6 is a sectional view showing a state of one variation of a selectable one-way clutch at time of low temperature.

FIG. 6 shows a variation of the present invention. In the variation, the clutch is provided with a spring moving mechanism 50 instead of the spindle moving mechanism 5 of the above embodiment, the spring moving mechanism 50 moving a fixed position where a spring 12 is fixed. The spring moving mechanism 50 includes a cylinder 51 formed into a closed-end cylindrical shape in the held plate 2; a movable plate 52 provided slidably in the cylinder 51 and having the spring 12 fixed thereon; and an encapsulation material 53 encapsulated in a region surrounded by the cylinder 51 and the movable plate 52. The encapsulation material 53 can be composed of materials similarly to the encapsulation material 38 of the above embodiment, and the its volume changes according to temperature change. Accordingly, in a case of the clutch of this variation, at time when the environmental temperature becomes low, the encapsulation material 53 reduces and the movable plate 52 and the fixed position of the spring 12 move in a direction leaving from the selector plate 4. As a result, since the elastic force of the spring 12 acting on the pawl member 11 gets smaller, the pawl member 11 goes into a state that the pawl member 11 does not protrude sufficiently. Thereby, also with respect to the clutch in the variation, as with the clutch in the above mentioned embodiment, even if the rotational position of the selector plate 4 is switched to the lock position unintentionally by the influence of viscous property of gear oil, since the protrusion amount of each pawl member 11 is insufficient, it is possible to suppress occurrence of erroneous engagement that the pawl members 11 engages with the recess 15 of the rotational plate 3.

EXPLANATION OF REFERENCES 1 a clutch
2 a held plate (a first plate)
3 a rotational plate (a second plate)
4 a selector plate 5 a spindle moving mechanism
11 a pawl member
15 a recess
16 an aperture
17 a non-formation portion where no aperture is formed
31 a displacement portion
32 a holding portion
Ax an axial line
P a spindle

The invention claimed is:

1. A selectable one-way clutch comprising:
a first plate and a second plate which are disposed on an axial line shared with each other;
at least one pawl member, each being provided to the first plate rotatably via a spindle in such a manner that the pawl member is capable of protruding from the first plate toward the second plate, and, in a case of protruding from the first plate, engages with a recess formed in the second plate only when the second plate is rotating in a predetermined one rotational direction;
a selector plate where at least one aperture which the pawl member is allowed to pass through is formed, the selector plate being rotatable relatively to the first plate between a lock position where the pawl member is allowed to protrude from the first plate by passing through the aperture and a release position where the pawl member is kept in a state that the pawl member is housed in a first plate side by contacting a non-formation portion where no aperture is formed; and
a device which restricts an operation of the pawl member, by using volume change of material whose volume changes according to temperature change, so that the pawl member is more restricted to protrude from the first plate as an environmental temperature gets lower.

2. The selectable one-way clutch according to claim 1, further comprising a spindle moving mechanism provided to the first plate, the spindle moving mechanism supporting the spindle movably in a direction close to the selector plate, wherein
the spindle moving mechanism includes a displacement portion which, by using the volume change of the material, more displaces the spindle in the direction close to the selector plate as the environmental temperature gets lower; and a holding portion which is provided to the displacement portion to hold the spindle.

3. The selectable one-way clutch according to claim 2, wherein
the displacement portion includes:
a cylinder formed into a closed-end cylindrical shape in the first plate;
a movable plate provided in the cylinder slidably in a direction of the axial line with respect to the cylinder;
an interlock shaft fixed to the movable plate while extending in the direction of the axial line; and
a lid closing an opening portion of the cylinder where the interlock shaft is inserted, and
the material is encapsulated in a region surrounded by the movable plate, the cylinder, and the lid, and has such a property that a volume of the material reduces in a case where the environmental temperature gets lower.

4. The selectable one-way clutch according to claim 1, comprising:
a spring provided to the first plate, the spring biasing the pawl member in a protruding direction to the second plate; and
a spring moving mechanism which is capable of moving in a direction leaving from the selector plate, a fixed position where the spring is fixed, wherein
the spring moving mechanism, by using the volume change of the material, more displaces the fixed position in the direction leaving from the selector plate as the environmental temperature gets lower.

5. The selectable one-way clutch according to claim 4, wherein
the spring moving mechanism includes:
a cylinder formed into a closed-end cylindrical shape in the first plate; and
a movable plate fixed to the spring, the movable plate being provided in the cylinder slidably in the direction leaving from the selector plate, and
the material is encapsulated in a region surrounded by the cylinder and the movable plate, and has such a property that a volume of the material reduces in a case where the environmental temperature gets lower.

* * * * *